Jan. 5, 1965  T. T. DOOLEY  3,163,945
BRUSH RAKE ATTACHMENT FOR BULLDOZER BLADE
Filed Aug. 22, 1963  2 Sheets-Sheet 1
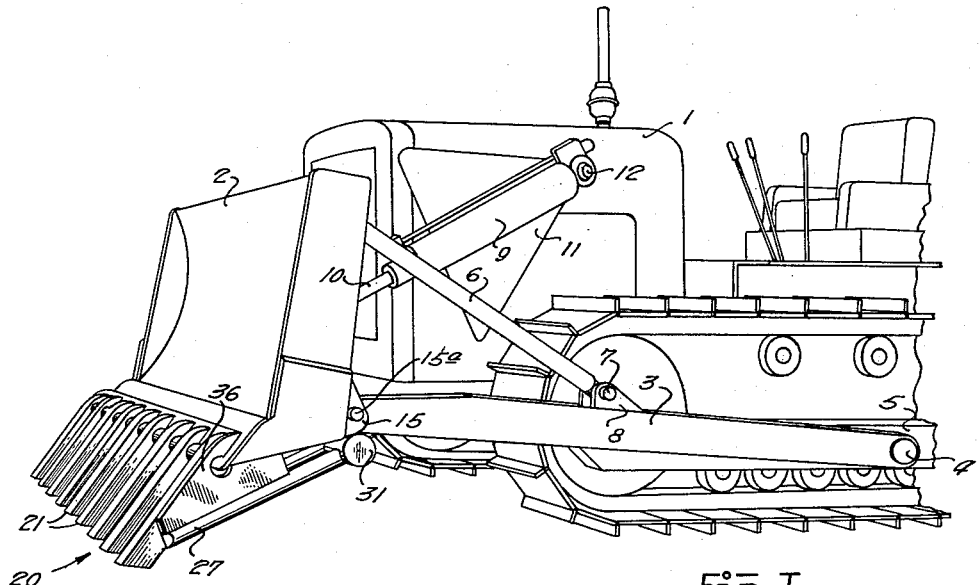
Fig. I
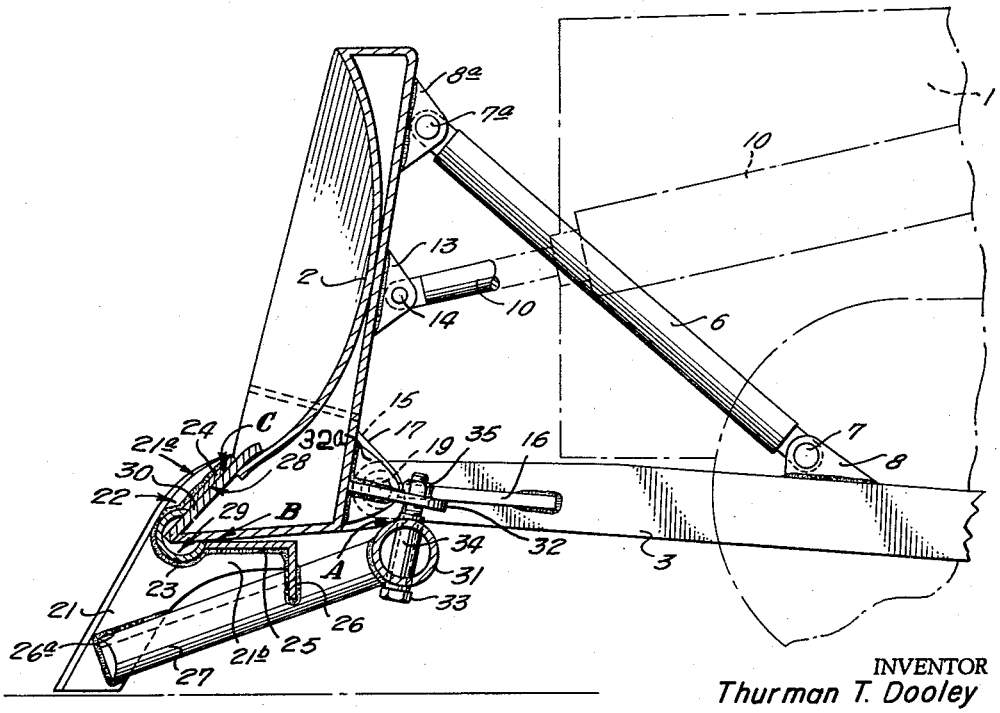
Fig. II
INVENTOR
Thurman T. Dooley
BY Howard E. Moore
ATTORNEY Jan. 5, 1965                T. T. DOOLEY                3,163,945
          BRUSH RAKE ATTACHMENT FOR BULLDOZER BLADE
Filed Aug. 22, 1963                              2 Sheets-Sheet 2
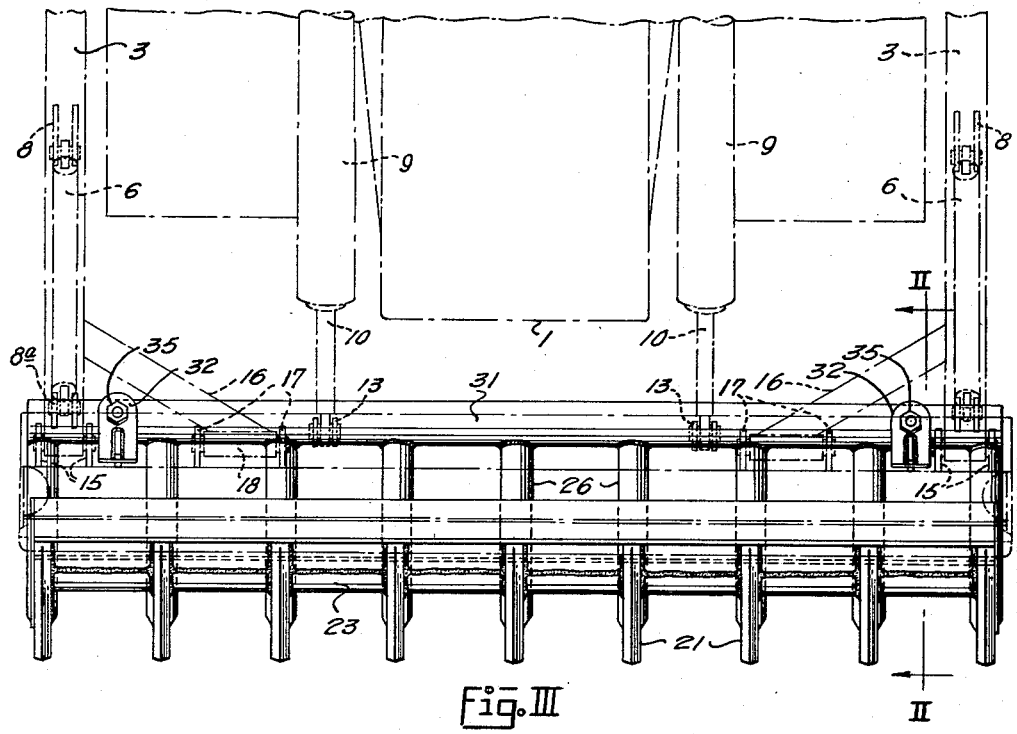
Fig. III
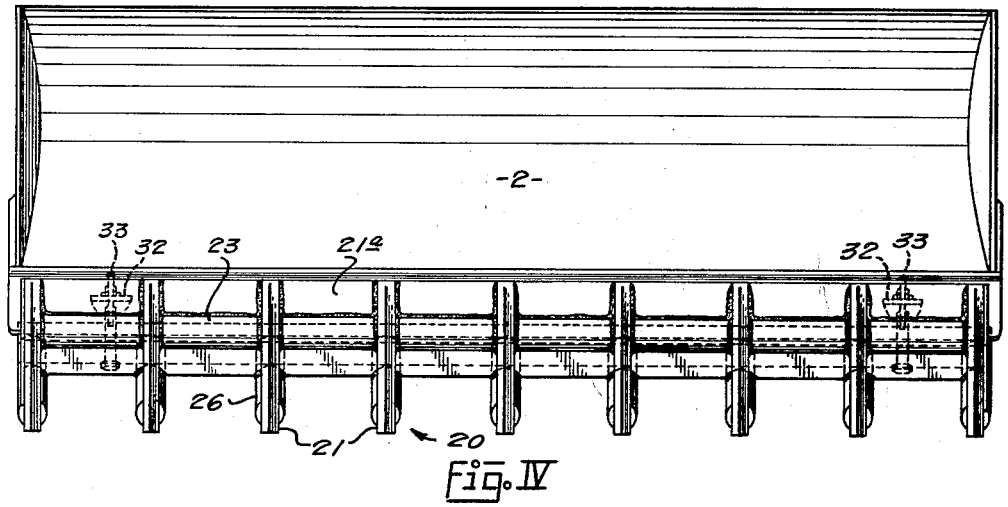
Fig. IV
INVENTOR
Thurman T. Dooley
BY  *Howard E. Moore*
ATTORNEY

United States Patent Office 3,163,945
Patented Jan. 5, 1965

3,163,945
BRUSH RAKE ATTACHMENT FOR
BULLDOZER BLADE
Thurman T. Dooley, Greenville, Tex., assignor to Cougar Manufacturing Company, Inc., Greenville, Tex., a corporation of Texas
Filed Aug. 22, 1963, Ser. No. 303,760
5 Claims. (Cl. 37—2)

This invention is concerned with an attachment to be detachably secured to the moldboard of a bulldozer, and is particularly concerned with a brush rake arranged to be detachably secured to the lower edge of a blade secured to the front lower edge of the moldboard on a bulldozer.

Brush rake attachments for bulldozer moldboards have heretofore been known in the art, but all of such devices are characterized by complexity of mounting, bulkiness, weak and insecure mounting, and are unduly expensive to manufacture.

The present invention is intended to provide a relatively compact, inexpensive and easy to mount brush rake attachment for a bulldozer moldboard, and at the same time provides a very secure mounting, which is braced at three spaced points, and which may be quickly and easily mounted and demounted from the moldboard.

It is, therefore, a primary object of the invention to provide a brush rake which may be detachably mounted to the lower edge of a moldboard on a bulldozer in such a manner that it is firmly secured thereto and braced against downward and rearward thrust, so that it has no tendency to rotate rearwardly underneath the moldboard when a load is imposed thereupon.

Another object of the invention is to provide a brush rake attachment for a moldboard on a bulldozer which requires minimum effort and time to attach same thereto, wherein only two bolts are required for attachment of same to the rear side of the moldboard so that it may be quickly attached to and detached therefrom.

A still further object of the invention is to provide a brush rake attachment for the lower edge of the moldboard on a bulldozer which includes a V-shaped channel on the inner side thereof which may be positioned over the blade extending along the lower edge of the moldboard, which channel includes a rounded inner surface spaced from the cutting edge of the blade to protect same from damage, and further includes a rearwardly extending portion underneath the moldboard and a transverse brace member at the rear thereof, arranged to engage outwardly extending members on the rear lower side of the moldboard, to provide a three point brace for the attachment, to-wit; at the top of the blade, at the lower side of the blade, and at the rear of the moldboard, which permits the attachment to be suspended to the rear side of the moldboard by two bolts, yet provides a firm and secure attachment to the moldboard.

Still another object of the invention is to provide a brush rake attachment for a moldboard, which extends only along the lower edge of the moldboard and no attachment members are needed to extend upwardly along the front or rear faces of the moldboard to the top thereof, thereby leaving the outer face of the moldboard unobstructed for performing its usual function and no obstructions are provided on the outer and inner faces of the moldboard, which could collect brush or other debris to clog up the moldboard.

A further object of the invention is to provide a brush rake attachment for a moldboard which requires no alteration of the moldboard or blade thereon for attachment thereto, other than two mounting brackets on the back side of the moldboard, so that when removed the moldboard and blade are ready for normal use.

A general object of the invention is to provide a brush rake attachment which is firmly secured to the lower edge of the moldboard, and which may be mounted on and demounted therefrom with a minimum of effort.

Other and further objects of the invention will become apparent upon reading the detailed specification hereinafter following, and by referring to the drawings annexed hereto.

A suitable embodiment of the invention is shown in the attached drawings, wherein:

FIGURE I is a front perspective view of the novel brush rake attachment attached to the moldboard of a bulldozer;

FIGURE II is a cross-sectional, elevational view of the brush rake attachment attached to the moldboard of a bulldozer, taken on the line II—II of FIGURE III;

FIGURE III is a top plan view of the brush rake attachment attached to the moldboard of a bulldozer; and FIGURE IV is a front elevational view of the brush rake attachment attached to the moldboard of a bulldozer.

Numeral references are employed to designate the various parts shown in the drawings, and like numerals indicate like parts throughout the various figures of the drawings.

The numeral 1 indicates a crawler type tractor on which is mounted at the front thereof a moldboard 2, to which is secured at the lower edge thereof a substantially V-shaped blade 30. The crawler tractor, and moldboard and blade assembly, is generally referred to in the trade as a "bulldozer."

The moldboard 2 is mounted on arms 3 extending on each side of the tractor 1 by means of trunnion mountings 4, which pivotally secure the arms 3 to the track frames 5 on each side of the tractor.

The front ends of the arms 3 are pivotally attached to the rear side of the moldboard 2 at each end thereof by means of spaced mounting lugs 15, secured to the rear side of the moldboard, and pivot bolts 15a which extend through the lugs 15 and the outer ends of the arms 3.

Braces 6 extend between the upper surfaces of the arms 3 and the upper rear side of the moldboard 2 and are pivotally attached to said members by means of the spaced brackets 8 and 8a, and the pivot bolts 7 and 7a, which extend through said brackets and the ends of the braces 6.

The moldboard 2 may be raised and lowered about the trunnions 4 by means of hydraulic rams 9 which are pivotally attached to the mounting plates 11 at each side of the bulldozer by means of the trunnion mountings 12.

Extensible piston rods 10 extend from the hydraulic rams 9 and are pivotally attached to the rear side of the moldboard 2 near each end thereof by means of brackets 13 and pivot bolts 14, which pass through said brackets and the outer ends of the piston rods 10.

Inwardly extending, angularly disposed braces 16 are secured to the inner sides of the arms 3 and are pivotally attached to the rear side of the moldboard 2 by means of tubular sleeves 18 welded or otherwise secured to the inner ends of the arms 16, which are rotatably disposed between the spaced pairs of brackets 17, secured to the rear side of the moldboard, by means of pins 19 which extend through the brackets 17 and the sleeves 18.

It will be observed that the brackets 17 have lower edges which are on the same horizontal plane with the lower edges of the brackets 15 for the purposes hereinafter explained.

The brush rake attachment is generally indicated by the numeral 20, and includes a plurality of spaced tines or teeth 21 which extend angularly outwardly from the lower edge of the blade 30 of moldboard 2.

The brush rake attachment 20 is a fabricated assembly and includes a mounting or base member generally indicated at 22 formed by a tubular shaped transverse member 23 which has an opening along its inner edge to provide a semi-circular transverse recess or channel 29.

An angular, upwardly and inwardly extending plate 24 is welded to the semi-circular tubular part 23, and an inwardly extending bottom plate 25, having a right angular, downwardly extending flange 26 is welded to the semi-circular tubular element 23. The blades, or tines 21, have upwardly extending portions 21a and inwardly extending portions 21b which are respectively welded to the plates 24 and 25.

A reinforcing bar 27 is welded at its outer end, as indicated at 26a, to the lower inner edge of each tine 21 and each such bar 27 is extended through a cut-out in the lower edge of the downwardly extending flange portion 26 of bottom plate 25, and is welded thereto.

An end plate 36 is provided on each end of the assembly 20, each such end plate having one of the reinforcement bars 27 welded along the lower edge thereof, as indicated in FIGURE I.

The top plate 24 and the bottom plate 25 are so related to the transverse semi-tubular part 23, as to provide an interior, substantially V-shaped channel 28 on the inner side of the brush rake assembly, which is arranged to receive the blade 30.

It will be noted from FIGURE II that when the blade 30 is disposed in the channel 28, and the upper and lower surfaces of the blade are engaged with the inner surfaces of the plates 24 and 25, the edge of the blade 30 is spaced from the inner surface of the semi-circular channel 29, so that the cutting edge of the blade is protected against damage when load is imposed upon the brush rake assembly.

A transverse tubular bar 31 is secured by welding to the inner ends of the reinforcing bars 27, to thereby complete the brush rake assembly 20.

Mounting lugs 32 are secured to the inner side of the moldboard 2 at the lower outer ends thereof, and are reinforced by gussets 32a welded to the rear side of the moldboard.

A hole is provided through each lug 32, which holes are arranged to receive the threaded bolts 33, which are suspended thereto by means of nuts 35.

The bolts 33 extend through the tubular spacer sleeves 34 secured in aligned holes provided through the wall of the tubular bar 31.

Thereby the brush rake assembly 20 is, in effect, suspended to the brackets 32 at the rear side of the moldboard, and these are the only required attachment for the brush rake assembly.

In order to attach the brush rake assembly 20 to the lower edge of the moldboard 2, the transverse V-shaped channel 28 is positioned over the blade, which may be done by simply aligning the channel 28 with the blade 30 as the assembly is supported in raised position as shown in FIGURE II, and moving the bulldozer forwardly to cause the blade 30 to enter the channel 28. The spaced aligned holes through the transverse tubular bar 31 are then aligned with the holes through the lugs 32, the two bolts are placed through the transverse brace bar 31, and the lugs 32, and bolted in place. The bolts 33 actually loosely extend through the holes in the brackets 32 and the nut 35 is threaded downwardly until the transverse tubular bar 31 engages the lower surfaces of the brackets 15 and 17.

It will be noted that the brush rake assembly contacts the moldboard and blade assembly at three triangular spaced points, to-wit, point A, being the contact between the transverse tubular bar 31 and the lugs 15 and 17 at the rear of the bulldozer moldboard, at point B, which is the contact between the lower plate 25 and the lower surface of the moldboard, and at point C, which is the contact point between the upper plate 24 and the upper surface of the bulldozer blade 30.

It will thus be seen that the brush rake attachment is firmly attached against any tendency of same to rotate downwardly and rearwardly in response to a rearward thrust exerted by a load encountered forwardly thereof. Actually the greater the load which is imposed against the front of the brush rake assembly, the firmer the mounting. Furthermore, it is securely attached to the moldboard assembly even when the tractor is backed away from the load, since it is suspended by the bolts 33 to the lugs 32 and is braced at points C and B, which would prevent any tendency for the brush rake assembly to counter-rotate about the lower edge of the blade 30.

It will be seen that it is a very simple procedure to mount and demount the brush rake attachment to the bulldozer moldboard and blade assembly, involving only the attachment and detachment of the two bolt and nut assemblies 33–35.

It will further be noted that the brush rake attachment is only attached to the blade and to the lowermost edge of the bulldozer moldboard, and no straps or other attachments are required to be extended upwardly to the upper edge of the moldboard and no bolt holes are required to be made in the bulldozer blade or moldboard. Therefore, it does not affect or alter the moldboard and blade assembly in any way, the blade is not damaged or dulled by the use thereof, and while attached to the moldboard, the entire inner surface of the moldboard is exposed for its normal and intended use.

It is believed apparent that I have provided a brush rake attachment for a bulldozer moldboard and blade assembly which is compact, relatively inexpensive to manufacture, easy to attach and detach, and which does not damage or require alteration of the moldboad or blade on the bulldozer, and allows the moldboard and blade to remain in their normal state for use when the brush rake attachment is detached therefrom.

It will be understood that other and further embodiments of the invention may be devised without departing from the spirit and scope of the appended claims.

Having described my invention, I claim:

1. In combination with a bulldozer having a moldboard thereon with a substantially V-shaped portion extending along the lower front edge thereof;

a brush rake attachment for said moldboard comprising,
        a body;
        a substantially V-shaped channel formed along the inner side of the body and receiving the said V-shaped edge portion of the moldboard;
        a plurality of tines secured to the body and extending outwardly and downwardly with respect thereto;
        a brace member secured at the outer end thereof to each tine
            adjacent the lower inner end thereof and to the body intermediate the ends of the braces, said braces extending rearwardly of the body;
        a laterally extending bar secured to the inner ends of the brace members;
        stop means attached to the rear side of the moldboard engageable with the bar to limit upward movement thereof;
        and suspension means detachably suspending the bar to the rear side of the moldboard
            with the bar in position to contact the stop means.

2. The combination called for in claim 1 wherein the stop means are attachment lugs extending inwardly of the rear side of the moldboard.

3. The combination called for in claim 1 wherein the channel is terminated on its inner side by a circular shaped area of such diameter that the inner side thereof does not contact the edge of the V-shaped portion when it is disposed in the channel.

4. The combination called for in claim 1 wherein the suspension means includes
    a pair of spaced lugs extending rearwardly of the rear side of the moldboard, each having a hole therethrough;
and a pair of bolts secured to the bar,
each being slidably received through one of the holes;
and nuts threaded on the ends of the bolts above the lugs to suspend same to the lugs.

5. In combination with a bulldozer having a moldboard thereon with a substantially V-shaped portion extending along the lower front edge thereof;
a brush rake attachment for said moldboard comprising,
a body;
a substantially V-shaped channel formed along the inner side of the body and receiving the said V-shaped edge portion of the moldboard;
a plurality of tines secured to the body and extending outwardly and downwardly with respect thereto;
a brace member secured to each tine and to the body,
said brace member extending rearwardly of the body;
a laterally extending bar secured to the inner ends of the brace members;
stop means attached to the rear side of the moldboard engageable with the bar to limit upward movement thereof;
and suspension means detachably suspending the bar to the rear side of the moldboard with the bar in position to contact the stop means.

References Cited in the file of this patent

UNITED STATES PATENTS

| | | |
|---|---|---|
| 2,315,743 | Sieg | Apr. 6, 1943 |
| 2,840,936 | Rand | July 1, 1958 |
| 2,856,708 | Schnore | Oct. 21, 1958 |
| 2,992,499 | McSpadden | July 18, 1961 |